(12) United States Patent
Sorajja

(10) Patent No.: US 12,544,076 B2
(45) Date of Patent: Feb. 10, 2026

(54) METHOD AND SYSTEM FOR CLOSURE OF CARDIOVASCULAR APERTURES

(71) Applicant: AMX Technologies, LLC, Plymouth, MN (US)

(72) Inventor: Paul Sorajja, Plymouth, MN (US)

(73) Assignee: AMX Technologies, LLC, Plymouth, MN (US)

( * ) Notice: Subject to any disclaimer, the term of this patent is extended or adjusted under 35 U.S.C. 154(b) by 884 days.

(21) Appl. No.: 17/058,578

(22) PCT Filed: May 29, 2019

(86) PCT No.: PCT/US2019/034420
§ 371 (c)(1),
(2) Date: Nov. 24, 2020

(87) PCT Pub. No.: WO2019/232068
PCT Pub. Date: Dec. 5, 2019

(65) Prior Publication Data
US 2021/0186515 A1 Jun. 24, 2021

Related U.S. Application Data

(60) Provisional application No. 62/677,392, filed on May 29, 2018.

(51) Int. Cl.
*A61B 17/12* (2006.01)
*A61B 17/04* (2006.01)

(52) U.S. Cl.
CPC .... *A61B 17/12122* (2013.01); *A61B 17/0401* (2013.01); *A61B 17/12168* (2013.01); *A61B 2017/0404* (2013.01); *A61B 2017/0406* (2013.01)

(58) Field of Classification Search
CPC ............ A61B 17/0469; A61B 17/0485; A61B 2017/0409; A61B 2017/048; A61B 2017/047; A61B 17/0057; A61B 17/12122; A61B 2017/00575; A61B 17/0401; A61B 17/0482; A61B 2017/0488; A61B 2017/00637; A61B 2017/00659; A61B 17/12168; A61B 2017/0404
See application file for complete search history.

(56) References Cited

U.S. PATENT DOCUMENTS 4,779,616 A * 10/1988 Johnson ............. A61B 17/0485
606/148
5,665,096 A * 9/1997 Yoon ..................... A61B 17/062
606/139
6,280,460 B1 * 8/2001 Bolduc .............. A61B 17/0469
606/144

(Continued)

OTHER PUBLICATIONS

WIPO, U.S. International Search Authority, International Search Report and Written Opinion mailed Aug. 9, 2019 in International Patent Application No. PCT/US2019/034420, 8 pages.

*Primary Examiner* — Katherine H Schwiker
*Assistant Examiner* — Zehra Jaffri
(74) *Attorney, Agent, or Firm* — Inskeep IP Group, Inc.

(57) ABSTRACT

Methods and devices for closing tissue apertures in a patient, such as PFO, are disclosed. A suturing device is used to place a suture through areas of tissue that are intended to be closed. Pledgets or buttons can be placed on the suture and each side of the tissue to help maintain the closure.

17 Claims, 16 Drawing Sheets

(56) References Cited

U.S. PATENT DOCUMENTS

| | | |
|---|---|---|
| 2001/0002436 A1* | 5/2001 | Bowman ............ A61B 17/0469 606/232 |
| 2003/0009177 A1* | 1/2003 | Middleman ........ A61B 17/0469 606/127 |
| 2003/0139752 A1* | 7/2003 | Pasricha ............ A61B 17/0483 606/139 |
| 2005/0119675 A1 | 6/2005 | Adams et al. |
| 2007/0185530 A1 | 8/2007 | Chin-Chen et al. |
| 2009/0177031 A1* | 7/2009 | Surti .................. A61B 1/00087 606/139 |
| 2009/0306685 A1 | 12/2009 | Fill |
| 2012/0101434 A1 | 4/2012 | Stewart et al. |
| 2014/0200398 A1* | 7/2014 | Hawkins .......... A61B 17/12172 600/37 |
| 2017/0245885 A1 | 8/2017 | Lenker |
| 2017/0340443 A1 | 11/2017 | Stearns et al. |

* cited by examiner

METHOD AND SYSTEM FOR CLOSURE OF CARDIOVASCULAR APERTURES

RELATED APPLICATIONS

This application is the U.S. National Phase of and claims priority to International Application No. PCT/US2019/034420, International Filing date May 29, 2019, which claims benefit of and priority to U.S. Provisional Application Ser. No. 62/677,392 filed May 29, 2018 entitled Method and System for Closure of Patent Foramen Ovale, which is hereby incorporated herein by reference in its entirety.

BACKGROUND OF THE INVENTION

This invention relates to methods and systems for the repair of apertures and defects within the cardiovascular system. Such apertures or defects can include patent foramen ovale, atrial septal defect, left atrial appendage, pseudoaneurysm, and ventricle septal defect.

Atrial septal defect (ASD) is a heart defect in which blood flows directly between the atria (upper chambers) of the heart. The atrial septum forms the wall dividing the left atrium and right atrium. Defects in the septum are commonly congenital (e.g., primum, secondum, sinus venosus, etc.), but also may be iatrogenic, due to either transcatheter or surgical procedures. Ventricular septal defect (VSD) is a heart defect in which blood flows directly between the ventricles (lower chambers) of the heart. VSD may be congenital, iatrogenic, or related to myocardial ischemia and infarction. When the size of an ASD or VSD is clinically significant, volume overload of the chambers can result in heart failure and/or pulmonary hypertension from left-to-right shunting. Right-to-left shunting across an ASD or VSD can also result in systemic hypoxemia which leads to lower-than-normal oxygen levels in the arterial blood that supplies the brain, organs, and tissues. Transcatheter therapy of an ASD or VSD typically entails placing an oversized device ("clamshell") inside the defect.

The foramen ovale is a small hole located in the septum (wall) of a heart between the two upper chambers of the heart, the right and left atriums. Before birth, a human does not use its lungs to get blood rich in oxygen. Instead, this blood comes from the mother's placenta and is delivered through the umbilical cord. The foramen ovale makes it possible for the blood to go from the veins to the right side of the fetus' heart, and then directly to the left side of the heart. The foramen ovale normally closes as blood pressure rises in the left side of the heart after birth. Once it is closed, the blood flows to the lungs to get oxygen before it enters the left side of the heart and gets pumped to the rest of the body.

A patent foramen ovale (PFO) is a foramen ovale that did not close properly at birth, so there is still an opening or hole in the septum. In many cases, the PFO does not stay open at all times. Rather, the PFO behaves more like a flap that opens when there is higher pressure than normal in the right atrium. Whether the PFO is persistently or intermittently open, blood flow across the PFO between the right and left atria can occur. Normally, left atrial pressure is higher than right atrial pressure. Situations that can cause greater pressure in the right atrium include straining during bowel movements, coughing and sneezing. When the pressure gets high enough, blood may move through the PFO from the right atrium to the left atrium.

PFO is common and has been associated with occurrence of systemic embolization, which may result in transient or permanent disabling stroke. Closure of PFO may be performed surgically or, more commonly, with percutaneous methods. Such methods commonly rely on devices such as occluders, which straddle the PFO and surrounding structures to cease blood flow between the left and right atria. These devices work in most patients, but can be bulky, cause tissue erosion, and prohibit repeat use of the atrial septum as a conduit for future access to the left atrium from the right atrium. Access across the atrial septum is needed in the event that a patient may require procedures in the left atrium, such as left atrial appendage closure, mitral valve interventions, and ablation of arrhythmias, among other many procedures.

The left atrial appendage (LAA) is derived from the left wall of the primary atrium, which forms during the fourth week of embryonic development. It has developmental, ultrastructural, and physiological characteristics distinct from the left atrium proper. The LAA lies within the confines of the pericardium in close relation to the free wall of the left ventricle and thus its emptying and filling may be significantly affected by left ventricular function. Left atrial appendage occlusion (LAAO), also referred to as Left atrial appendage closure (LAAO) is a treatment strategy to reduce the risk of left atrial appendage blood clots from entering the bloodstream and causing a stroke in patients with non-valvular atrial fibrillation (AF). Left atrial appendage closure is an implant-based alternative to blood thinners. Successful closure of LAA is highly dependent on device sizing from within the structure, which can be highly irregular in shape and size. Leaks around LAAO devices are thus common.

A pseudoaneurysm, also known as a false aneurysm, occurs from rupture of a wall of cardiovascular structure, such as the aorta, left atrium, or left ventricle, among other areas. The rupture can be infectious, post-traumatic, related to myocardial ischemia or infarction, or iatrogenic. Pseudoaneurysms are collections of blood from the disruption of the structure that are contained by surrounding tissue. Because this tissue is relatively weak, the pseudoaneurysm is a risk of further rupture and can be life-threatening. Open cardiac surgery and transcatheter therapy can be used to treat such pseudoaneurysms. Surgery is often high risk due to underlying pathology that caused the pseudoaneurysm and may not be effective due to poor tissue integrity. The transcatheter approach involves devices that are typically circular or oval, and often not purpose built for treatment of pseudoaneurysms, which can be highly irregular in shape. Leaks around such devices used for pseudoaneurysm therapy thus are common.

Therefore, new methods and techniques for closure of these cardiac apertures are needed.

SUMMARY OF THE INVENTION

The present invention is generally directed to methods and devices for closing tissue apertures in a patient, such as patent foramen ovale, atrial septal defect, left atrial appendage, pseudoaneurysm, and ventricle septal defect. One embodiment is directed to a method of using a suturing device to place a suture and pledgets on each side of areas of tissue that are intended to be closed.

Another embodiment is directed to a device for placing a suture through target tissue, having a curved suture delivery tube that faces an apposition catheter. A suture wire is passed through the curved tube, through the tissue, and into an opening in the apposition catheter. A grasping device, such as a compressible mesh, is used in the apposition catheter to grab on to the end of the suture and pull it through the tissue until a knotted end of the suture wire (or attached button) contacts the tissue.

Another embodiment is directed to a device for placing a suture through target tissue, having a curved suture delivery tube that faces a pivoting arm. Target tissue is placed between the end of the curved suture delivery tube and an end of the arm, which is pivoted up against the tissue. A suture wire is passed through the curved tube, through the tissue, and into an end of the arm. The arm and the attached suture are retraced into the device, pulling the suture wire through the tissue until a knotted end of the suture wire (or attached button) contacts the tissue.

Another embodiment is directed to a patch delivery device for closing a tissue aperture. The device includes a pusher catheter that pushes a holding mechanism for a patch out of an outer guide catheter. The patch has a plurality of eyelets that are attached to previously placed suture wires around the tissue aperture. Once the patch is placed over the tissue aperture, the pusher catheter and holding mechanism are withdrawn and the suture wires are knotted to maintain the patch in place.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
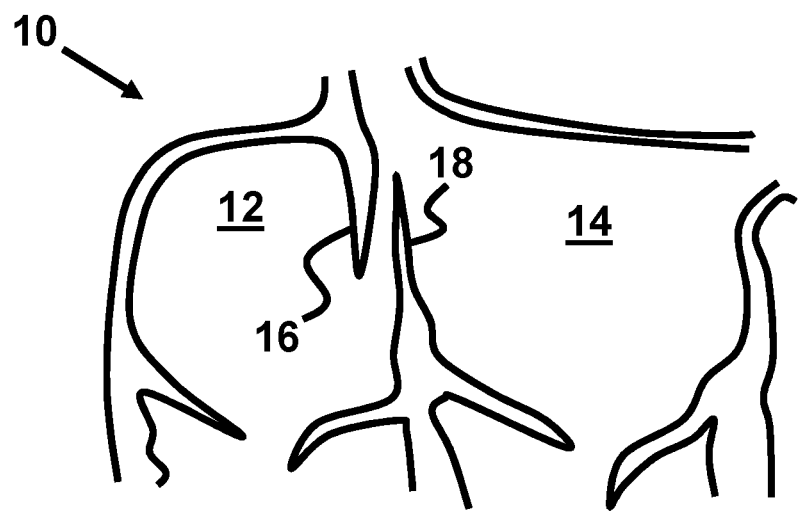
FIG. 1 illustrates a portion of a heart with a PFO.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention is generally directed to closure devices and methods of closings openings, such as patent foramen ovale, atrial septal defect, left atrial appendage, pseudoaneurysm, and ventricle septal defect. For simplicity, patent foramen ovale is discussed with reference to some figures of this specification, however it should be understood that any aperture or defect closure is possible, including the above examples.

As seen in the depiction of the heart 10 in FIG. 1, a PFO is an opening between the right atrium 12 and left atrium 14, between the unattached superior limbus 16 and the septum primum 18. This condition can be corrected by closing the PFO via a surgical procedure. In one embodiment, the device of U.S. Pat. No. 9,877,833 can be used for such a closure, the entirety of which is hereby incorporated by reference. The '833 device uses self-knotting sutures for mitral valve repair, but not for PFO closure.

Figure 2:
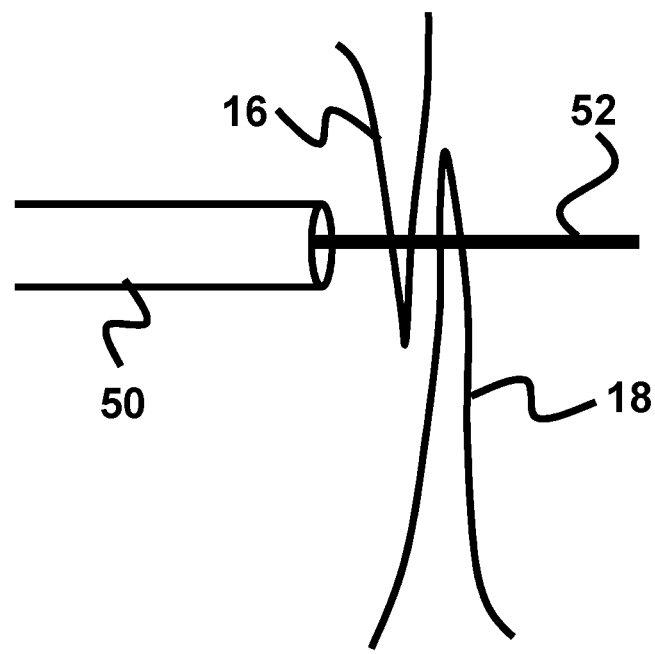
FIG. 2 illustrates a device and method of suturing a PFO.
Figure 3:
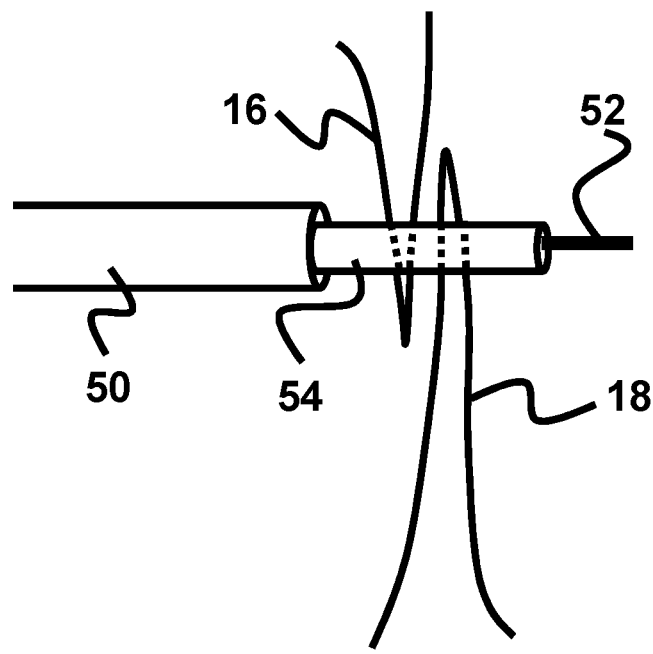
FIG. 3 illustrates a device and method of suturing a PFO.

As best seen in FIG. 2, a guiding catheter 50, inserted from a central venous access, is positioned such that its distal end is located proximate to the right atrial side of the superior limbus 16. The superior limbus 16 is pierced and traversed by a crossing tool 52, such as a needle, catheter, wire, or the like, which may be electrified. Next, the septum primum 18 is then traversed by same crossing tool 52 so that its distal end is positioned in the left atrium 14. A delivery catheter 54 is advanced over the crossing tool 52 and through the superior limbus 16 and septum primum 18, as seen in FIG. 3.

Figure 4:
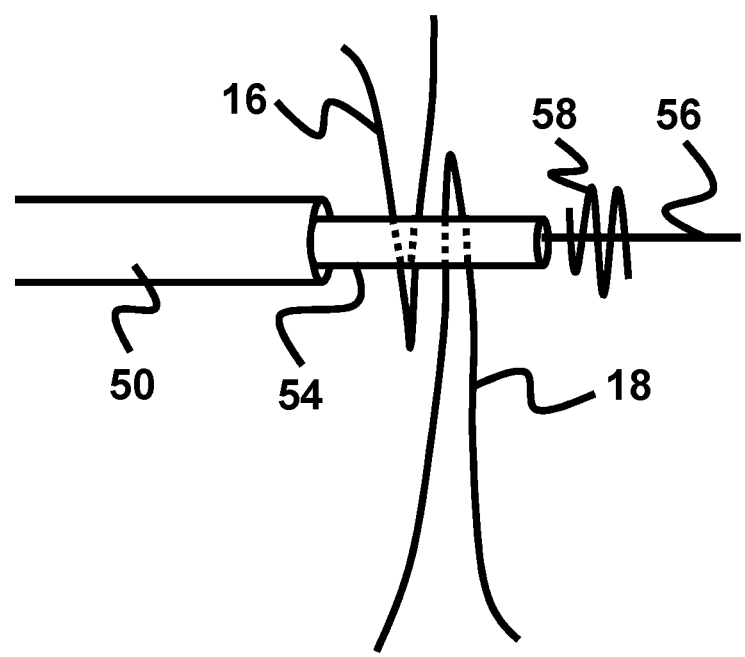
FIG. 4 illustrates a device and method of suturing a PFO.
Figure 5:
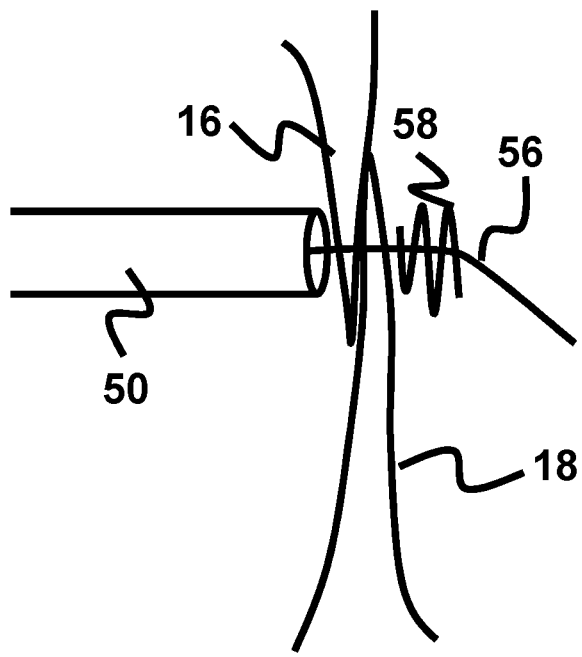
FIG. 5 illustrates a device and method of suturing a PFO.
Figure 6:
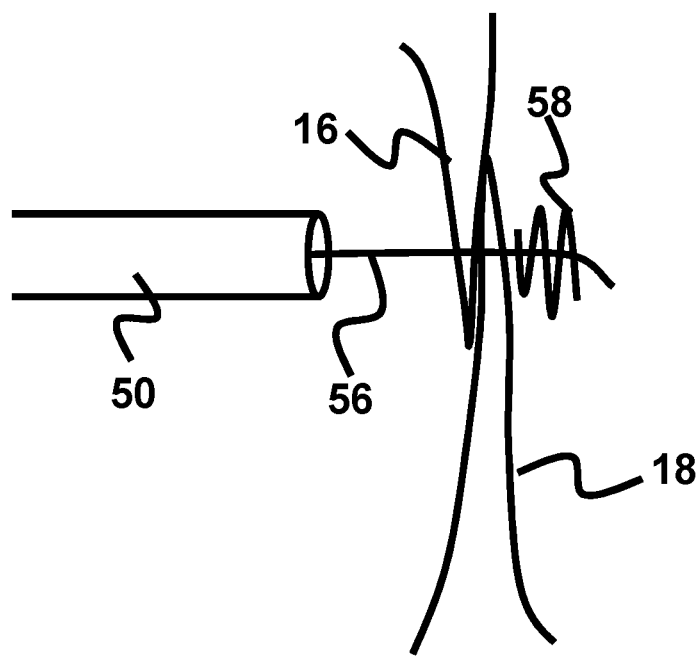
FIG. 6 illustrates a device and method of suturing a PFO.

Referring to FIG. 4, a self-knotting suture 56 having a pledget 58 attached is advanced out a distal end of the guide catheter 50 and through the delivery catheter 54 so as to be positioned in the left atrium 14. As seen in FIG. 5, the delivery catheter 54 is retracted from the superior limbus 16 and septum primum 18 and the guide catheter 50 is partially retracted to provide some space between it and the superior limbus 16 (FIG. 6).

The suture 56 is retracted, causing the pledget to fold on the left atrial side of the septum primum 18. Further retraction leads to apposition of the septum primum 18 and superior limbus 16 as seen in FIGS. 5 and 6.

Figure 7:
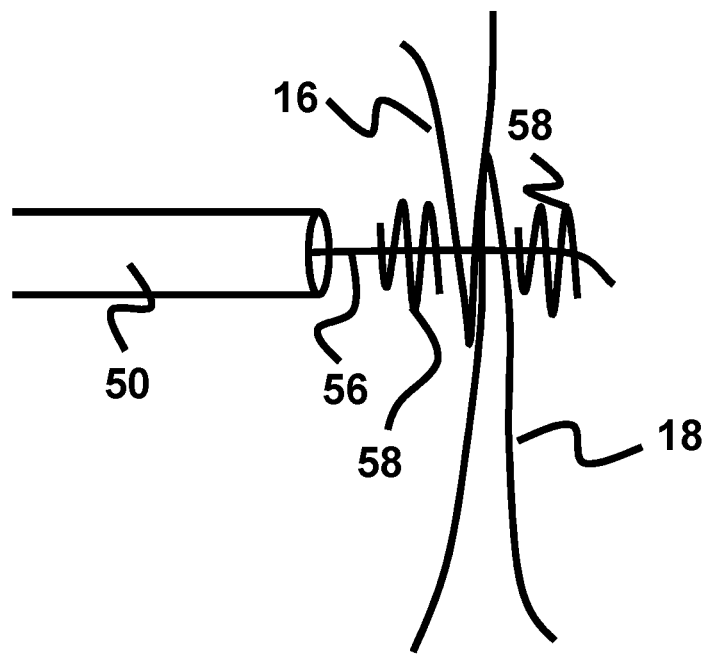
FIG. 7 illustrates a device and method of suturing a PFO.
Figure 8:
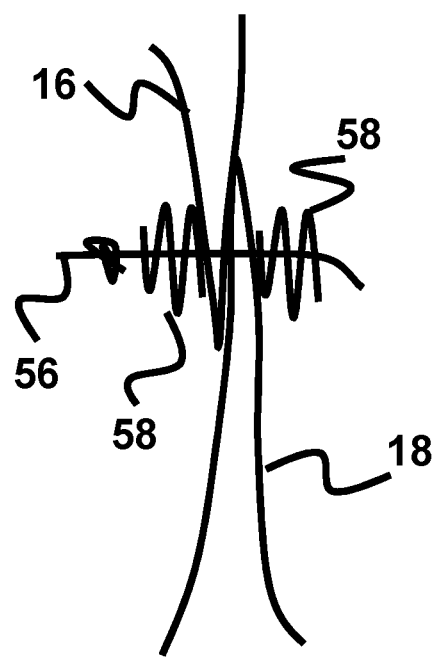
FIG. 8 illustrates a device and method of suturing a PFO.
Figure 9:
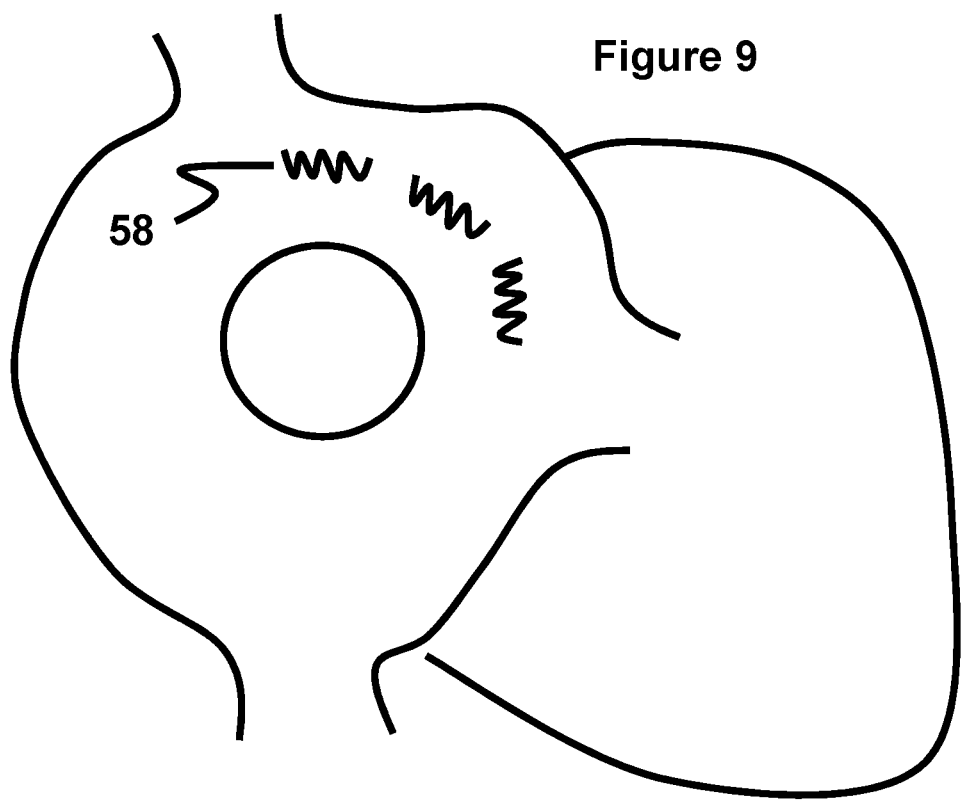
FIG. 9 illustrates a device and method of suturing a PFO.
Figure 10:
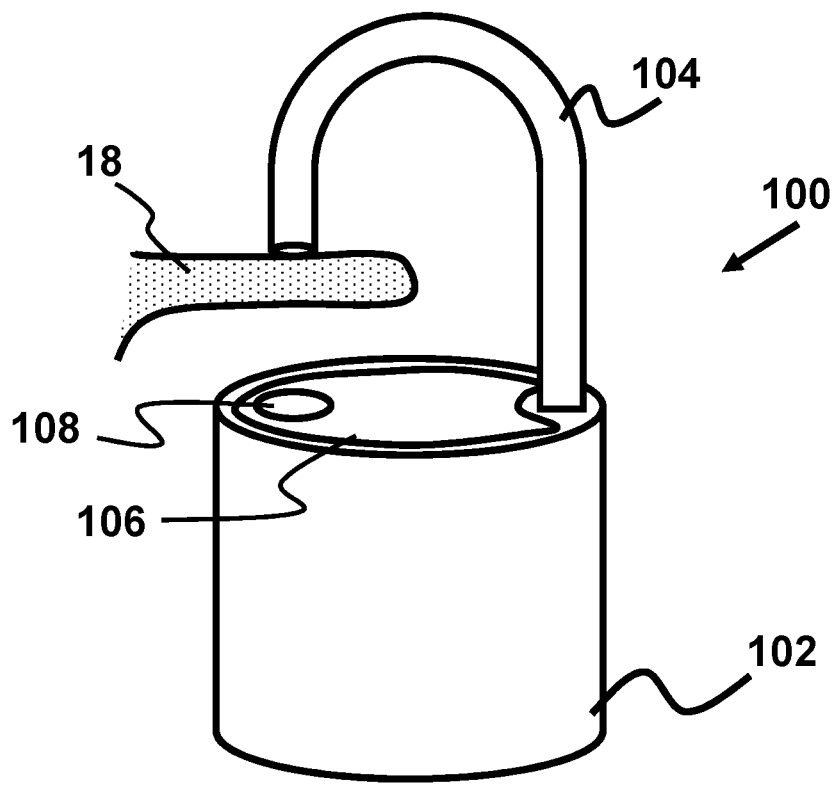
FIG. 10 illustrates a device and method of suturing a portion of tissue.

A second pledget 58 is inserted and placed over the suture 56 to the right atrial side of superior limbus 16 (FIG. 7). The suture 56 is knotted, followed by advancement of the knot to the right atrial pledget as seen in FIG. 8. A cutting tool is then delivered through the guiding catheter 50 to trim the suture. The entire method can then be repeated to insert additional self-knotting sutures in other areas of the PFO as shown in FIG. 10.

The previously described procedure, or other procedures utilizing sutures, can also be performed with the device 100 in FIGS. 10-15 that can be used for suturing tissue in which both of its sides are at least initially accessible to the device 100 (e.g., the septum primum 18). These figures illustrate usage of the device 100 with only the septum primum 18 for simplicity, but it should be understood that the device 100 can be used to connected both the septum primum 18 and the superior limbus 16 together, as well as tissue located in other areas of the body.

The closure device 100 is composed of an outer guide catheter 102 that has a lumen within it that contains an apposition catheter 106 and a rim engagement catheter 104. Preferably, the apposition catheter 106 and the rim engagement catheter 104 are separately moveable relative to each other and the apposition catheter 106 may include a groove along its length (seen in FIG. 10) to accommodate the position of the rim engagement catheter 104 within the guide catheter 102.

The rim engagement catheter 104 preferably has a tubular shape with a distal end that curves around so that the opening of the catheter 104 opens towards the apposition catheter 106. In one embodiment, the rim engagement catheter 104 is composed of a flexible material that allows it to move between a straight configuration when retracted within the guide catheter 102 and a self-biased curved shape. In an alternate embodiment, the rim engagement catheter 104 maintains a curved shape but has a radius of curvature that is smaller than the profile or cross-sectional diameter of the outer guide catheter 102.

Figure 11:
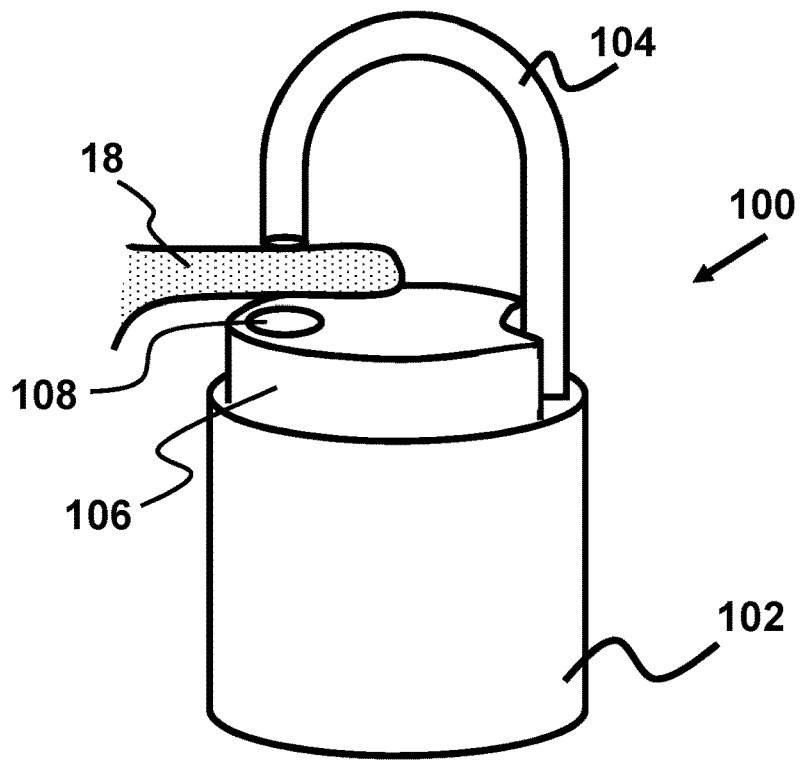
FIG. 11 illustrates a device and method of suturing a portion of tissue.
Figure 12:
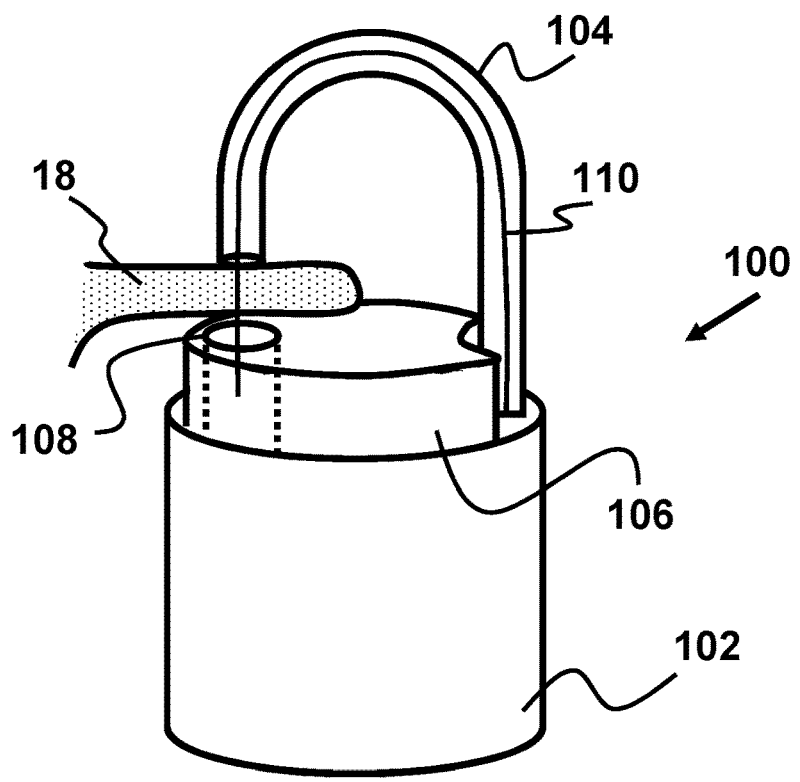
FIG. 12 illustrates a device and method of suturing a portion of tissue.

As seen in FIG. 10, a distal end of the guide catheter 102 is advance in proximity of the tissue to be sutured (e.g., septum primum 18) so that the distal face of the apposition catheter 106 is on one side of the tissue and the opening of the rim engagement catheter 104 is positioned on the opposite side of the tissue. In FIG. 11, the apposition catheter 106 is advanced distally so that both catheters 104, 106 are in relatively close proximity to each side of the tissue.

Next, a suture wire 110 is advanced through the internal lumen/passage of the rim engagement catheter 104, passes through the tissue, and into passage 108 of the apposition catheter 106. The suture wire 110 can include a needle connected to a degradable suture material or can be a needle connected to a rigid wire that is connected to a degradable suture. A rigid, elongated pusher device can also be used to help advance the suture wire 110 during a procedure.

Figure 13:
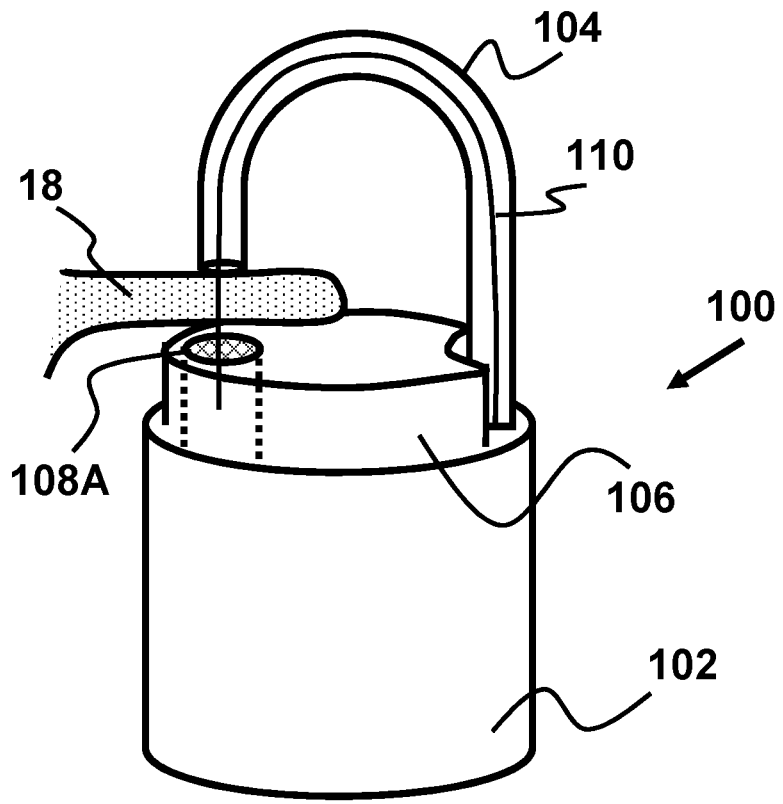
FIG. 13 illustrates a device and method of suturing a portion of tissue.
Figures 14, 15:
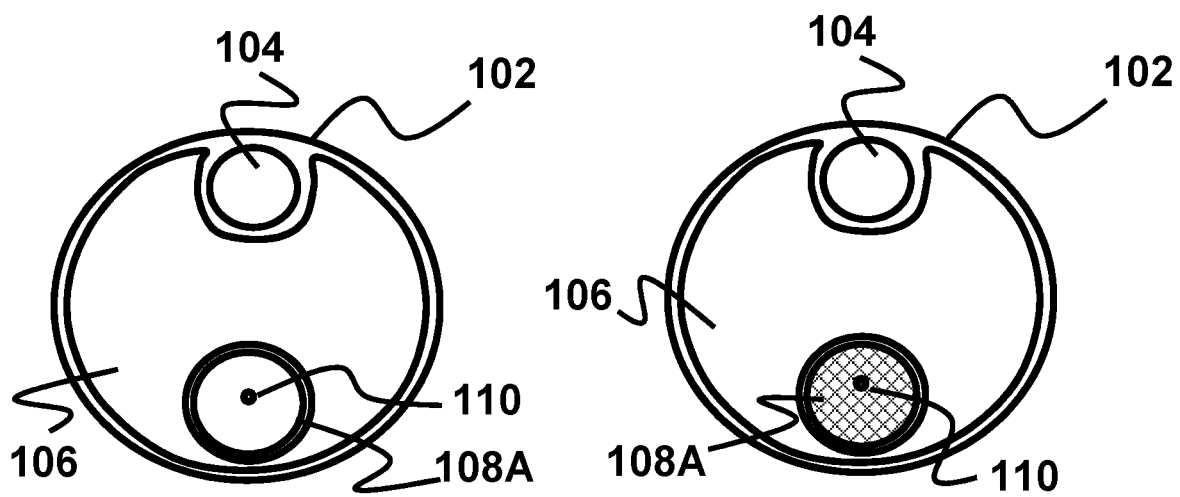
FIG. 14 illustrates a device and method of suturing a portion of tissue.
FIG. 15 illustrates a device and method of suturing a portion of tissue.

As seen in FIGS. 13-15, once the suture wire 110 has passed through the tissue and into the passage 108, a mesh 108A at the distal end of the passage 108 compresses or contracts radially around the wire 110, causing the wire to be captured or engaged. The mesh 108A can be a generally flat disc shape that closes similar to an iris or can be a tubular shape that expands/compresses similar to a stent. Either shape of the mesh 110 can be controlled at a proximal end of the device 100 by a control wire.

Figure 16:
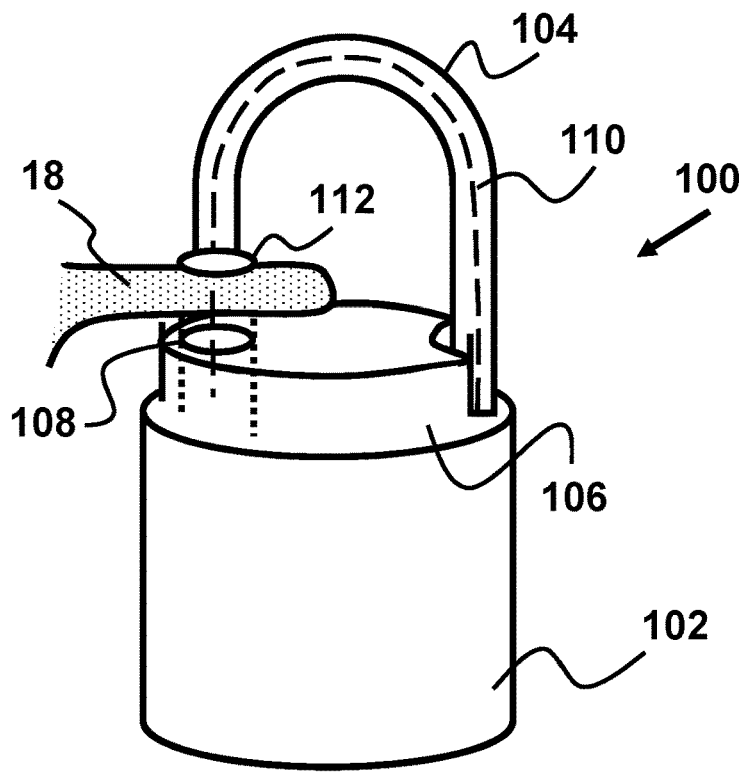
FIG. 16 illustrates a device and method of suturing a portion of tissue.
Figure 17:
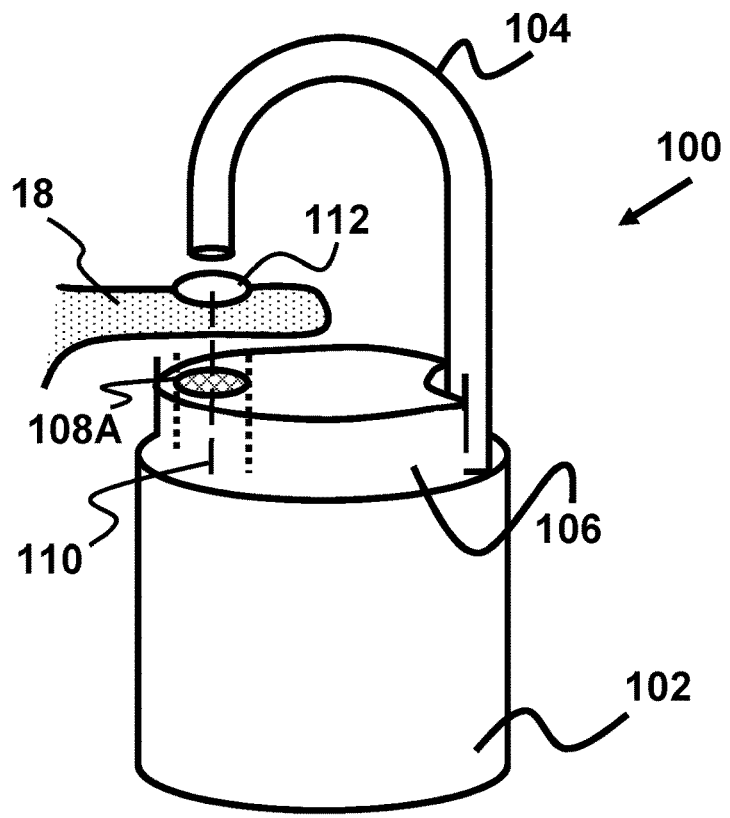
FIG. 17 illustrates a device and method of suturing a portion of tissue.

Once engaged with the mesh 108A, the apposition catheter 106 can be withdrawn into the guide catheter 102 so that the proximal end of the suite wire 110 engages the tissue. In one example embodiment, the proximal end of the suture wire 110 includes an attached pledget and a knot or enlarged stopper that prevents its proximal end from passing through the tissue. In another example seen in FIGS. 16 and 17, an enlarged button 112 is temporarily fixed at the distal end/opening of the rim engagement catheter 104. When the suture wire 110 is pulled through the button 110 and reaches a knot or stopper on the end of the suture wire 110, the button 112 is pulled off the rim engagement catheter 104, preventing the suture wire 110 from being pulled through the tissue.

Finally, the suture wire 110 on the proximal side is either knotted or attached to a second button 112, securing the suture wire 110 in place through the target tissue (e.g., through the septum primum 18 and superior limbus 16). Any suture wire 112 remaining proximal of the suture point can be cut away and the device 100 can be removed from the patient.

Figure 18:
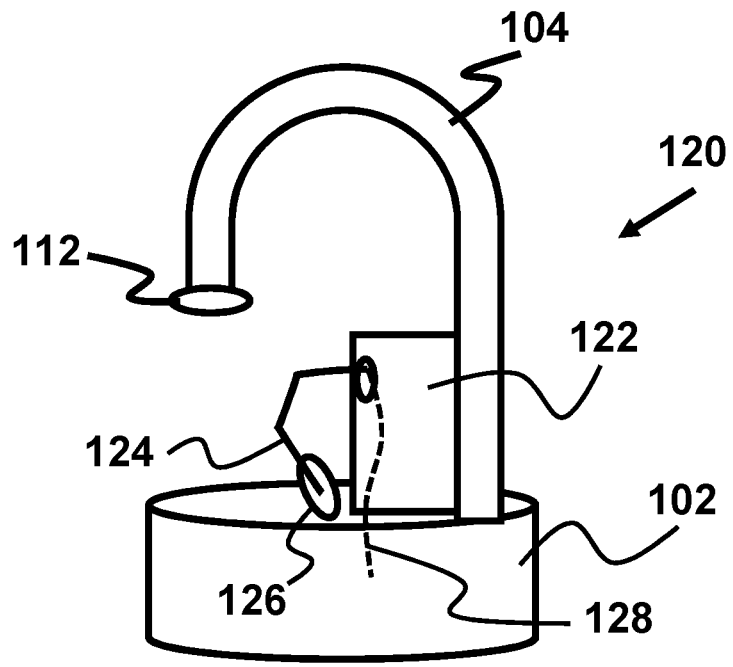
FIG. 18 illustrates a device and method of suturing a portion of tissue.

FIGS. 18-21 illustrate another embodiment of a suture device 120 that is similar to the previously described device 100, having a guide catheter 102, a rim engagement catheter 104, and an apposition catheter 122. Instead of being positioned directly under the opening of the rim engagement catheter 104, the apposition catheter 122 is positioned to the side of the opening, as seen in FIG. 18, and further includes a movable arm 124 that can be positioned underneath a target tissue area. In one embodiment, the arm 124 has a has a bent shape (e.g., shape memory Nitinol bent in the proximal direction) that is connected at its proximal end to a control wire 128, allowing a user to pull the wire 128 and thereby move/pivot the arm 124. The distal end of the arm 124 includes a suture capturing member 126 that is configured to capture a suture wire 110. For example, suture capturing member 126 can be a circular wire supporting a membrane that a suture wire 110 is capable of piercing. In another example, the suture capturing member 126 includes a circular/tubular mesh structure that can be selectively compressed or radially contracted on a suture wire 110 passing through.

Figure 19:
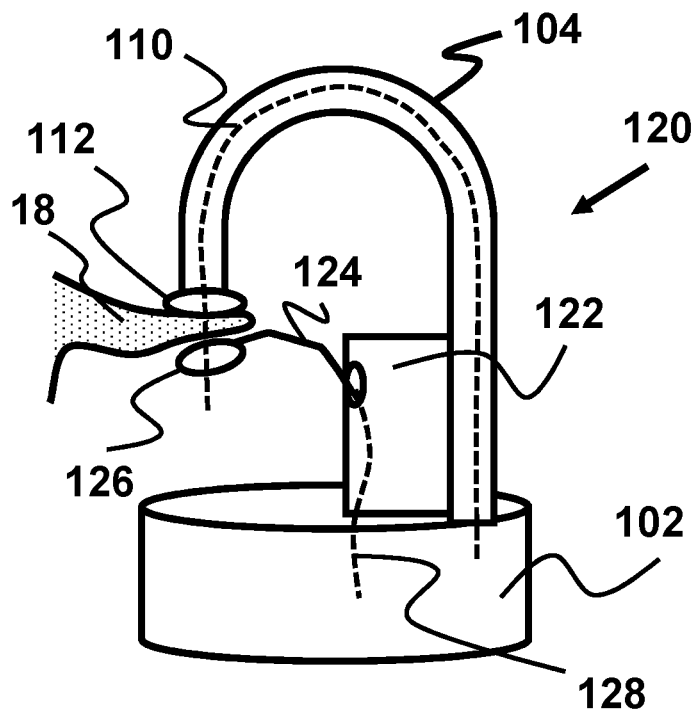
FIG. 19 illustrates a device and method of suturing a portion of tissue.

The device initially is configured as seen in FIG. 18, with its arm 124 located in a lowered position. In FIG. 19, the device 120 is moved over target tissue (e.g., the septum primum 18 and superior limbus 16) so that the rim engagement catheter 104 and button 112 are positioned on a distal side of the tissue. The control wire 128 is pulled, causing the arm 124 to pivot upwards towards the tissue. The suture wire 110 is advanced through the rim engagement catheter 104, through the button 112, through the tissue, and through the suture capturing member 126.

Figure 20:
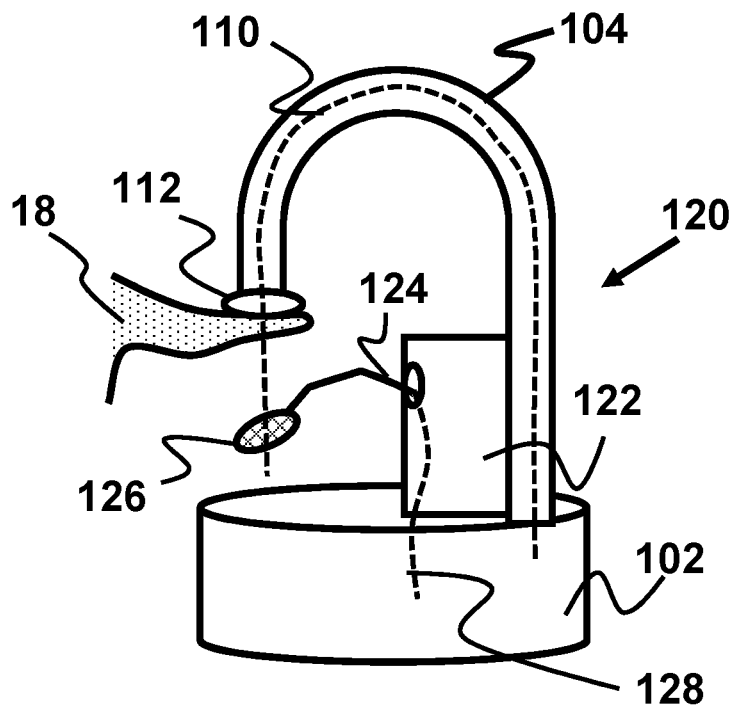
FIG. 20 illustrates a device and method of suturing a portion of tissue.
Figure 21:
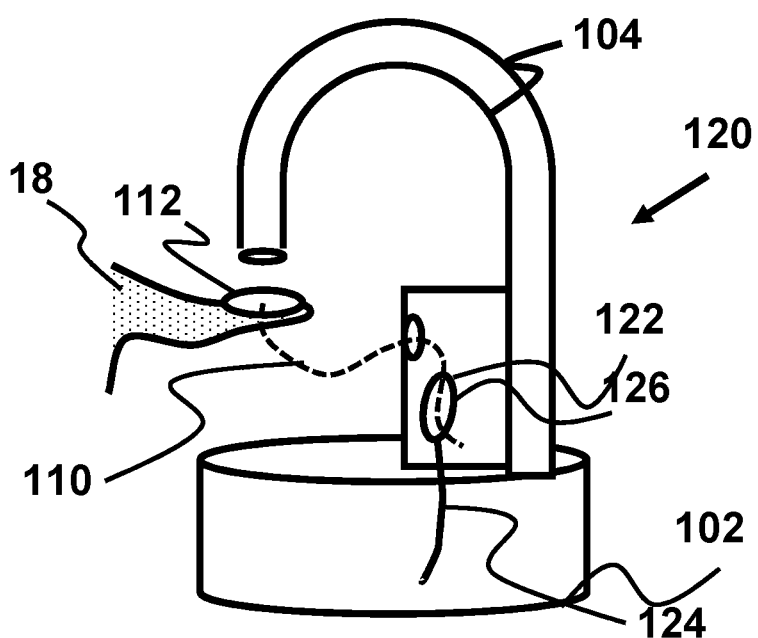
FIG. 21 illustrates a device and method of suturing a portion of tissue.

In FIGS. 20 and 21, the suture capturing member 126 is actuated (e.g., its mesh is contracted around the suture wire 110) and the control wire 128 is proximally pulled further, moving the arm 124 and the suture capturing member 126 into the apposition catheter 122. In this respect, the suture wire 110 is also pulled into the lumen of the apposition catheter 122 until an end knot or stopper reaches the button 112, causing it to detach from the rim engagement catheter 104 and abut the tissue. A second button or knot can be connected to the proximal portion of the suture wire 110 and advanced adjacent to the opposite side of the tissue.

Figure 22:
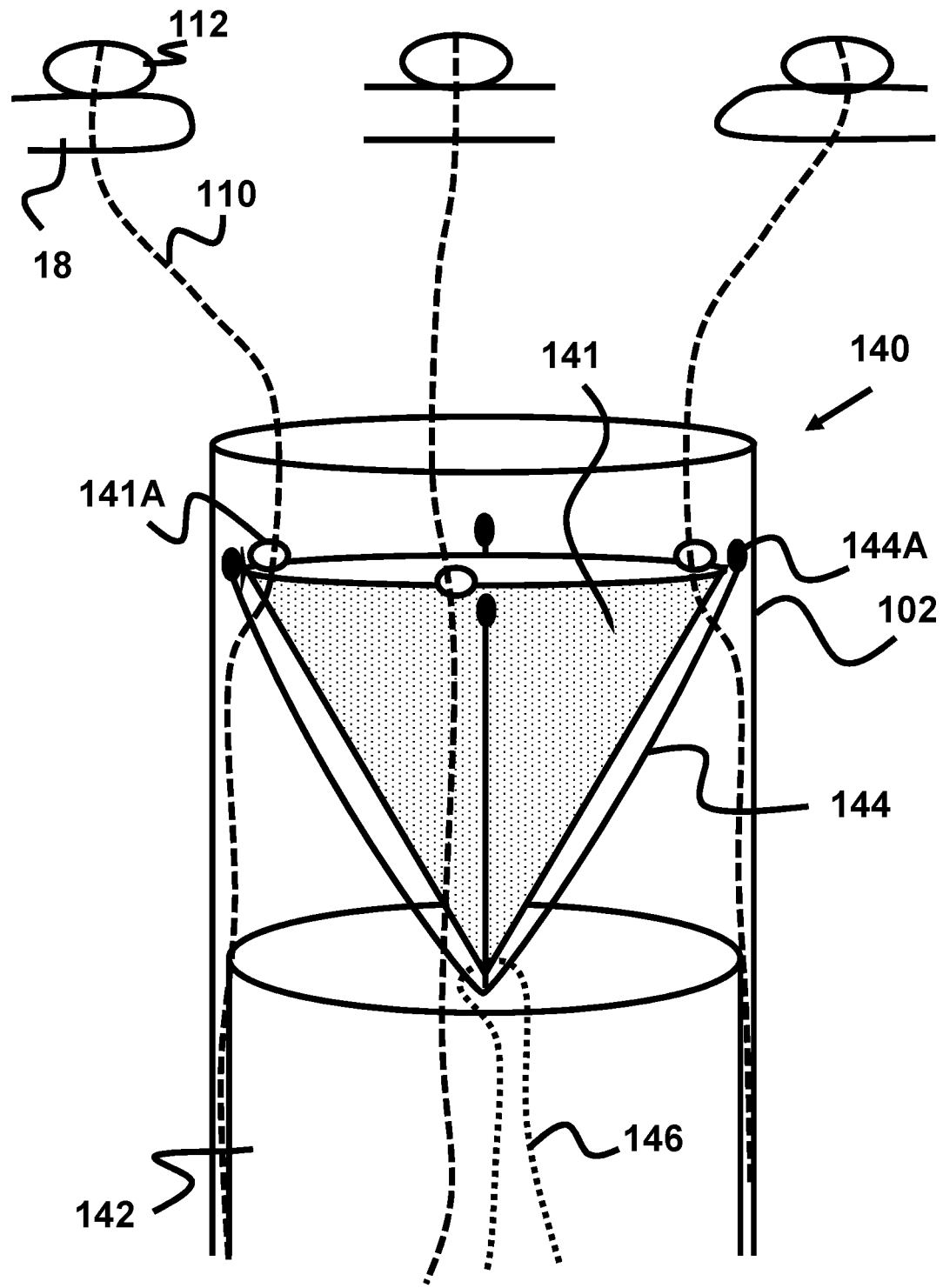
FIG. 22 illustrates a device and method of patching a portion of tissue.
Figure 23:
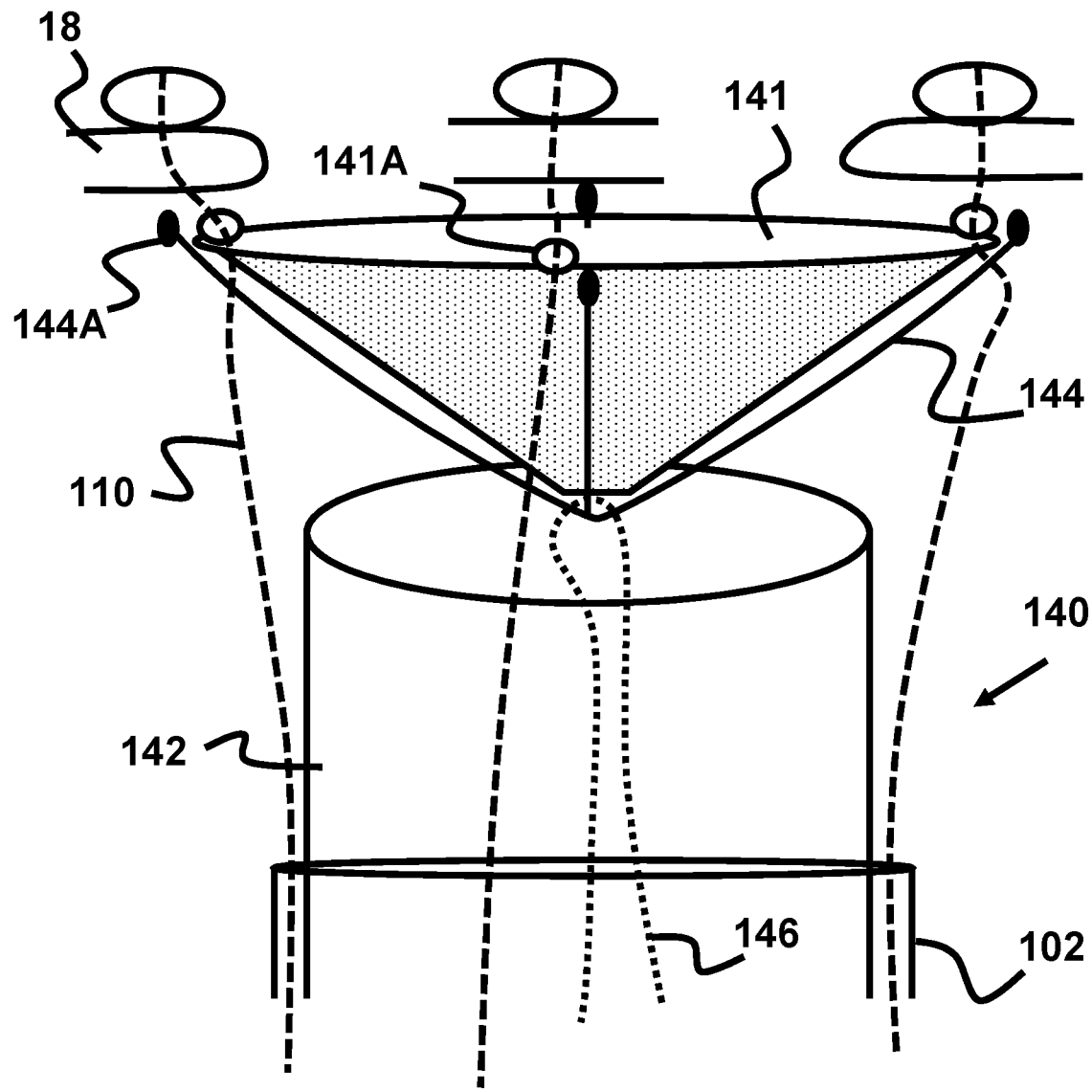
FIG. 23 illustrates a device and method of patching a portion of tissue.
Figure 24:
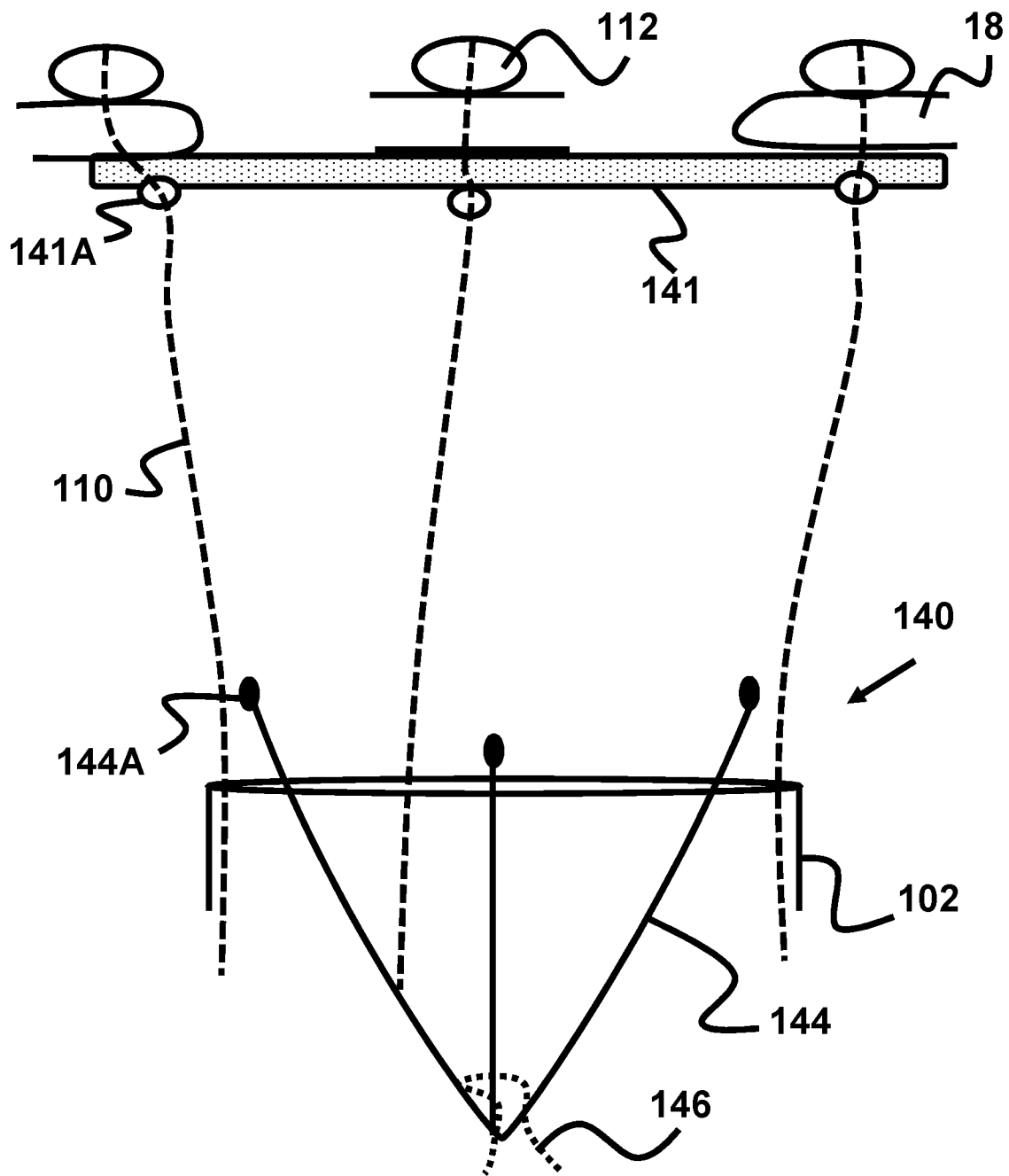
FIG. 24 illustrates a device and method of patching a portion of tissue.

FIGS. 22-24 illustrates an embodiment of a patch delivery device 140 used to patch or close an aperture within tissue. The delivery device 140 can be used with pre-implanted suture wires 110 (implanted either by hand or by one of the previously described devices), which assist in the implantation process as described further below.

Referring first to FIG. 22, a plurality of suture wires 110 are first placed through areas of the tissue (e.g., septum primum 18) near an opening that is intended to be closed. These suture wires 120 may be placed via one of the other devices described in this specification and may optionally include buttons 112 as also described. In the present example embodiment, three suture wires 110 are used, but 2, 4, 5, 6, or other numbers are also possible. The suture wires 110 can be placed into the myocardium, across the wall surrounding the defect, or wholly within the targeted aperture.

The device 140 includes an outer guide catheter 102 with a distal end opening that is advanced near the target aperture location. Within the lumen of the guide catheter 102 is a holding mechanism 144 that distally abuts the end of a pusher catheter 142. The holding mechanism 144 can be, for example, a plurality of elongated wires that form a "V" shape when compressed within the catheter 102, with end tips 144A that help retain a conically folded patch 141 within it. As seen in FIG. 23, the pusher catheter 142 can be distally advanced to move the holding mechanism 144 distally out of the guide catheter 102, causing the arms of the holding mechanism 144 and the patch 141 to radially expand.

The previously-placed suture wires 110 are positioned through eyelets 141A on the outer edge of the patch 141 to guide the patch 141 to a desired implantation position to cover the tissue aperture. The suture wires 110 preferably pass through the guide catheter 102 and back to the user at the proximal end of the device 140.

The pusher catheter 142 advances the holding mechanism 144 and patch 141 until the patch 141 becomes relatively flat against the aperture of the tissue, as aligned by the suture wires 110. As seen in FIG. 24, the pusher catheter 142 and the holding mechanism 144 can be withdrawn proximally back into the guide catheter 102. The holding mechanism 144 may include a tether 146 fixed to its proximal end and extending back to a proximal end of the device 140 to assist in this retraction. Finally, the suture wires 110 can be tied proximal of the patch 141 to secure the patch 141 in place and/or additional buttons 112 can be advanced over the wires 110 to the patch 141.

Figure 25:
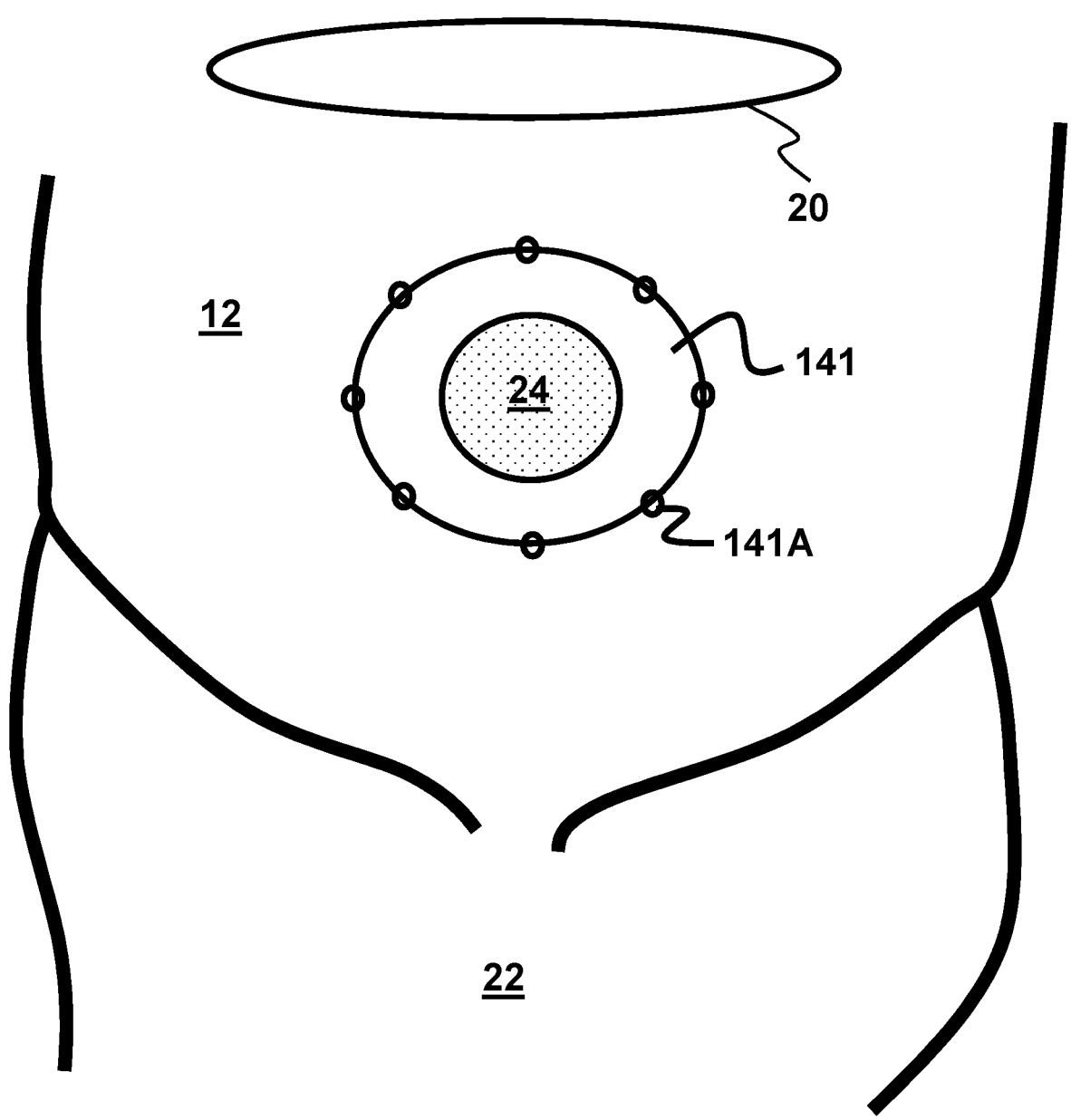
FIG. 25 illustrates a method of patching an atrial septal defect.

The patch 141 can be used to treat a variety of different conditions, particularly in the heart. For example, FIG. 25 illustrates an atrial septal defect 24 (ASD) covered by the patch 141 from the perspective of the right atrium 12 and right ventricle 22. The suture wires 110 can be placed circumferentially around the ASD 24 in a manner previously discussed in this specification, and then the patch 141 can be advanced via eyelets 141A over the suture wires 110 and secured in place over the ASD 24, preventing the passage of blood between atriums of the heart. As stated above, the suture wires 110 can be placed into the myocardium, across the wall surrounding the defect, or wholly within the targeted aperture.

Figure 26:
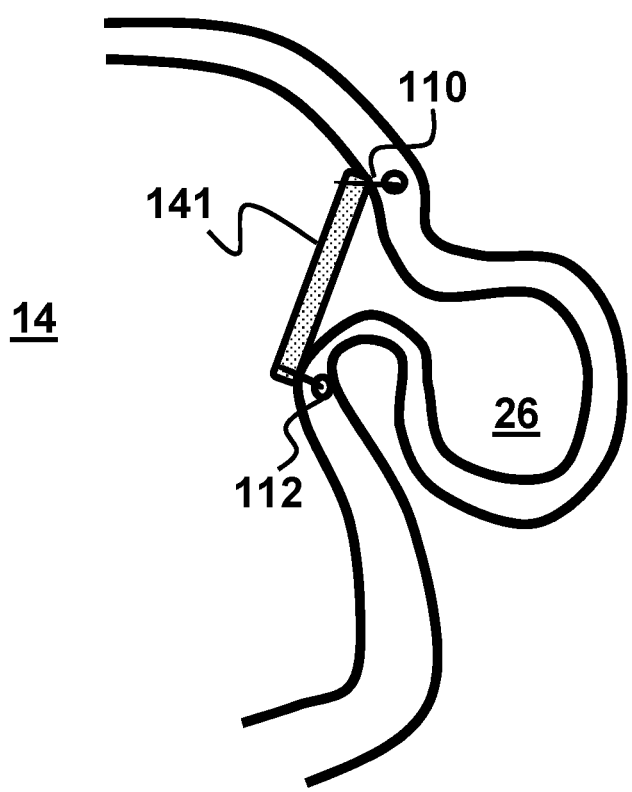
FIG. 26 illustrates a method of patching a left atrial appendage.

FIG. 26 illustrates another example of a left atrial appendage 26 (LAA) that is closed by the patch 141 within a left atrium 14. Similarly, the suture wires 110 can be placed circumferentially around the LAA 26 in a manner previously discussed in this specification, and then the patch 141 can be advanced via eyelets 141A over the suture wires 110 and secured in place over the LAA 26, preventing the passage of blood into the LAA 26. The suture wires 110 can be placed into the myocardium, pericardial space, or wholly within the aperture.

Figure 27:
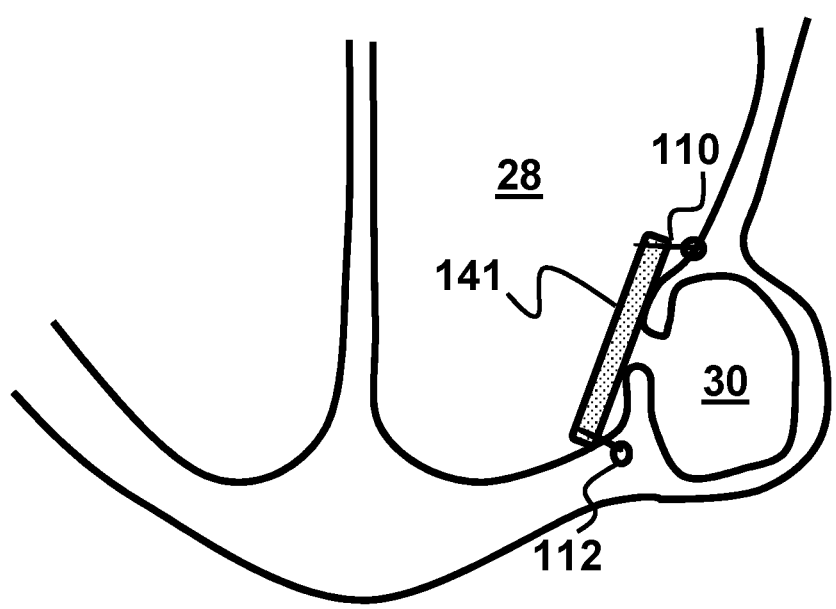
FIG. 27 illustrates a method of patching a pseudoaneurysm.

FIG. 27 illustrates another example of a pseudoaneurysm 30 that is closed by the patch 141 within a left ventricle 28 of a heart. Again, the suture wires 110 can be placed circumferentially around the pseudoaneurysm 30 in a manner previously discussed in this specification, and then the patch 141 can be advanced via eyelets 141A over the suture wires 110 and secured in place over the pseudoaneurysm 30, preventing the passage of blood into the pseudoaneurysm 30.

Figure 28:
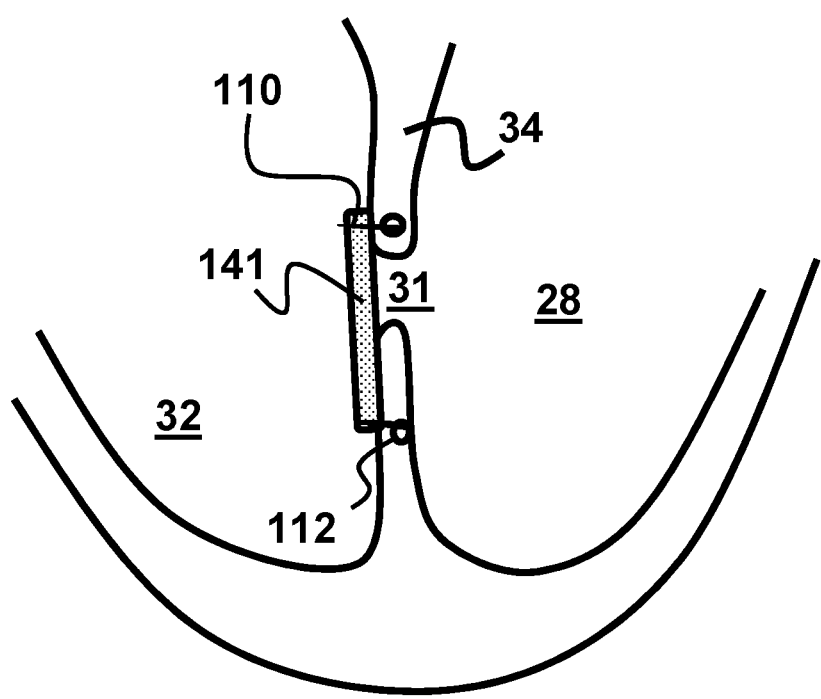
FIG. 28 illustrates a method of patching a ventricle septal defect.

FIG. 28 illustrates another example of a ventricle septal defect 31 (VSD) that is closed by the patch 141 within a right ventricle 32. The suture wires 110 can be placed circumferentially around the ventricle septal defect 31 in a manner previously discussed in this specification, and then the patch 141 can be advanced via eyelets 141A over the suture wires 110 and secured in place over the ventricle septal defect 31, preventing the passage of blood between the ventricles of the heart.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A device for implanting a suture in a patient, comprising:
   a rim engaging portion comprising a tubular passage extending distally from a distal end of said device and including a curved portion so that a distal opening of said tubular passage opens in a proximal direction, wherein the tubular passage contains a suture wire extending through the curved portion to the distal opening;
   an apposition catheter having a distal end located proximally of said distal opening of said tubular passage, and being movable relative to said rim engaging portion; and,
   a passage within said apposition catheter having a grasping device comprising a circular or tubular shape defining an outer perimeter which radially contracts about the suture wire when the suture wire extends thereinto from across a gap for receiving tissue defined between the distal opening of the tubular passage and the distal end of the apposition catheter.

2. The device of claim 1, wherein said grasping device further comprises a mesh.

3. The device of claim 1, wherein said grasping device further comprises an arm disposed at least partially within the apposition catheter.

4. The device of claim 3, wherein the passage within the apposition catheter includes an opening perpendicular to the distal opening of the tubular passage opening in the proximal direction.

5. The device of claim 1, wherein the distal opening of the tubular passage opening in the proximal direction is axially aligned with the passage within the apposition catheter.

6. The device of claim 1, wherein the rim engaging portion includes a button detachably connected thereto, the button covering the distal opening of the tubular passage opening in the proximal direction and configured to be pulled off the rim engaging portion by the suture wire and prevent an end of the suture wire from passing through tissue.

7. A device for implanting a suture in a patient, comprising:
   a tube extending distally from a distal end of said device and defining a curved segment so that a distal opening of the tube opens in a proximal direction, wherein the tube contains a suture wire extending through the curved segment to the distal opening from a proximal end of the device;

a catheter having a distal end aligned with the tube and being movable relative to the tube; and, a passage within the catheter having a grasping device comprising a circular or tubular shape and defining an outer perimeter, which radially contracts about the suture wire when the suture wire passes therein from across a gap for receiving tissue defined between the distal opening of the tube and the distal end of the catheter.

8. The device of claim 7, wherein the grasping device comprises a mesh.

9. The device of claim 7, wherein the grasping device further comprises an arm disposed at least partially within the catheter.

10. The device of claim 9, wherein the passage within the catheter is perpendicular to the distal opening of the tube opening in the proximal direction.

11. The device of claim 7, wherein the tube includes a button detachably connected thereto, the button covering the distal opening of the tube opening in the proximal direction and configured to be pulled off the tube by the suture wire and prevent an end of the suture wire from passing through tissue.

12. A device for implanting a suture in a patient, comprising:
a tubular portion extending from a distal end of the device and comprising a passage having a curved section so that a distal end of the tubular portion faces the distal end of the device, wherein the passage contains a suture wire extending through the curved section to the distal end of the tubular portion;
a catheter axially spaced from the distal end of the tubular portion and at least one of the tubular portion and the catheter being movable relative to the other; and,
a grasping device disposed on the catheter comprising a circular or tubular shape defining an outer perimeter which radially contracts about a suture wire delivered there into through the distal end of the tubular portion from across a gap for receiving tissue defined between the distal end of the tubular portion and a distal end of the catheter.

13. The device of claim 12, wherein the grasping device comprises a mesh.

14. The device of claim 12, wherein the grasping device further comprises an arm at least partially within the catheter; and wherein the arm is movable into the catheter.

15. The device of claim 14, wherein the arm includes a distal end including the grasping device and a proximal end connected to a control wire extending through the passage extending within the catheter.

16. The device of claim 12, wherein the distal end of the tubular portion facing the distal end of the device is axially aligned with the passage extending within the catheter, and wherein the passage is configured to receive the grasping device and the suture wire.

17. A device for implanting a suture in a patient, comprising:
a rim engaging portion comprising a tubular passage extending distally from a distal end of said device and curving so a distal opening of said tubular passage opens in a proximal direction;
an apposition catheter having a distal end located proximally of said distal opening of said tubular passage, and being movable relative to said rim engaging portion; and,
a passage within said apposition catheter and having a grasping device comprising a mesh configured to selectively contract in diameter around a suture wire passing therein.

* * * * *